(12) United States Patent  
Chiba

(10) Patent No.: US 12,542,116 B2
(45) Date of Patent: Feb. 3, 2026

(54) INFORMATION PROCESSING METHOD AND INFORMATION PROCESSING SYSTEM

(71) Applicant: SONY GROUP CORPORATION, Tokyo (JP)

(72) Inventor: Nobutane Chiba, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/715,991

(22) PCT Filed: Nov. 25, 2022

(86) PCT No.: PCT/JP2022/043438
§ 371 (c)(1),
(2) Date: Jun. 3, 2024

(87) PCT Pub. No.: WO2023/106114
PCT Pub. Date: Jun. 15, 2023

(65) Prior Publication Data
US 2025/0029576 A1    Jan. 23, 2025

(30) Foreign Application Priority Data
Dec. 10, 2021   (JP) .................. 2021-201147

(51) Int. Cl.
*G09G 5/10* (2006.01)
*G06V 20/50* (2022.01)

(52) U.S. Cl.
CPC .............. *G09G 5/10* (2013.01); *G06V 20/50* (2022.01); *G09G 2320/0626* (2013.01); *G09G 2320/0686* (2013.01); *G09G 2340/0464* (2013.01)

(58) Field of Classification Search
CPC ... G09G 5/10; G09G 2320/0626; G06V 20/50
See application file for complete search history.

(56) References Cited

U.S. PATENT DOCUMENTS

| | | | | |
|---|---|---|---|---|
| 2003/0164883 A1* | 9/2003 | Rooy | ............... | H04N 5/222 348/E5.022 |
| 2015/0091795 A1* | 4/2015 | Kang | ............... | G09G 3/3406 345/156 |
| 2015/0301670 A1* | 10/2015 | Chiu | ............... | G06F 3/0487 345/589 |

(Continued)

FOREIGN PATENT DOCUMENTS

| | | |
|---|---|---|
| CN | 1926497 A | 3/2007 |
| CN | 102150079 A | 8/2011 |
| CN | 103974010 A | 8/2014 |

(Continued)

OTHER PUBLICATIONS

International Search Report and Written Opinion of PCT Application No. PCT/JP2022/043438, issued on Jan. 31, 2023, 11 pages of ISRWO.

*Primary Examiner* — William Boddie
(74) *Attorney, Agent, or Firm* — CHIP LAW GROUP

(57) ABSTRACT

Provided is an information processing method that includes displaying, on a display that displays an image serving as a background of an object, a display image in which light intensity of a region where the object overlaps is reduced on an image captured by a camera that shoots at least a part of an area of a display surface of the display.

20 Claims, 19 Drawing Sheets

(56) References Cited

U.S. PATENT DOCUMENTS

2023/0043422 A1* 2/2023 Kawakami .............. G06F 3/011

FOREIGN PATENT DOCUMENTS

| | | |
|---|---|---|
| CN | 105023552 A | 11/2015 |
| CN | 105467719 A | 4/2016 |
| CN | 109618089 A | 4/2019 |
| CN | 110942018 A | 3/2020 |
| CN | 112689101 A | 4/2021 |
| JP | 2000-224410 A | 8/2000 |
| JP | 2000-305481 A | 11/2000 |
| JP | 2003-248107 A | 9/2003 |
| JP | 2008-097191 A | 4/2008 |
| JP | 2011-259047 A | 12/2011 |
| JP | 2012-208503 A | 10/2012 |
| JP | 2016-163228 A | 9/2016 |
| JP | 2017-098691 A | 6/2017 |
| WO | 2018/164105 A1 | 9/2018 |

\* cited by examiner

INFORMATION PROCESSING METHOD AND INFORMATION PROCESSING SYSTEM

CROSS REFERENCE TO RELATED APPLICATIONS

This application is a U.S. National Phase of International Patent Application No. PCT/JP2022/043438 filed on Nov. 25, 2022, which claims priority benefit of Japanese Patent Application No. JP 2021-201147 filed in the Japan Patent Office on Dec. 10, 2021. Each of the above-referenced applications is hereby incorporated herein by reference in its entirety.

TECHNICAL FIELD

The present technology relates to an information processing method, an information processing system, and a program, and more particularly, to an information processing method, information processing system, and program capable of making an outline portion of an object to be a subject less likely to appear to be emitting light.

BACKGROUND ART

In recent years, virtual production, which is an image-capturing method using a large light emitting diode (LED) display, has been widespread in shooting movies and drama. Shooting with the virtual production is performed so as to capture an image of a performer giving a performance in front of an LED display on which an image serving as a background is displayed.

Therefore, even in a situation where an image-capturing person or a performer cannot go to a shooting location, it is possible to shoot a movie or the like.

CITATION LIST

Patent Document

Patent Document 1: WO 2018/164105 A

SUMMARY OF THE INVENTION

Problems to be Solved by the Invention

Because the LED display is a self-luminous device, at a time of shooting with the virtual production, light emitted by the LED display irradiates the performer as an imaging target from behind.

In a case where the performer lit from a back side is viewed from a front side, an outline portion of the performer may appear to be emitting light. An image captured in such a state is not an image intended by the image-capturing person.

The present technology has been made in view of such a situation, and an object thereof is to make an outline portion of an object as a subject less likely to appear to be emitting light.

Solutions to Problems

An information processing method according to one aspect of the present technology includes displaying, on a display that displays an image serving as a background of an object, a display image in which light intensity of a region where the object overlaps is reduced on an image captured by a camera that shoots at least a part of an area of a display surface of the display.

In one aspect of the present technology, on a display that displays an image serving as a background of an object, there is displayed a display image in which light intensity of a region where the object overlaps is reduced on an image captured by a camera that shoots at least a part of an area of a display surface of the display.

MODE FOR CARRYING OUT THE INVENTION

Hereinafter, modes for carrying out the present technology will be described. The description will be given in the following order.

1. Virtual production shooting
2. Image used for display of LED display
3. Configuration of PC
4. Operation of PC 5. Light intensity adjustment of light intensity reduction region
6. LED display
7. Others

1. Virtual Production Shooting

Configuration Example of Image-Capturing System

Figure 1:
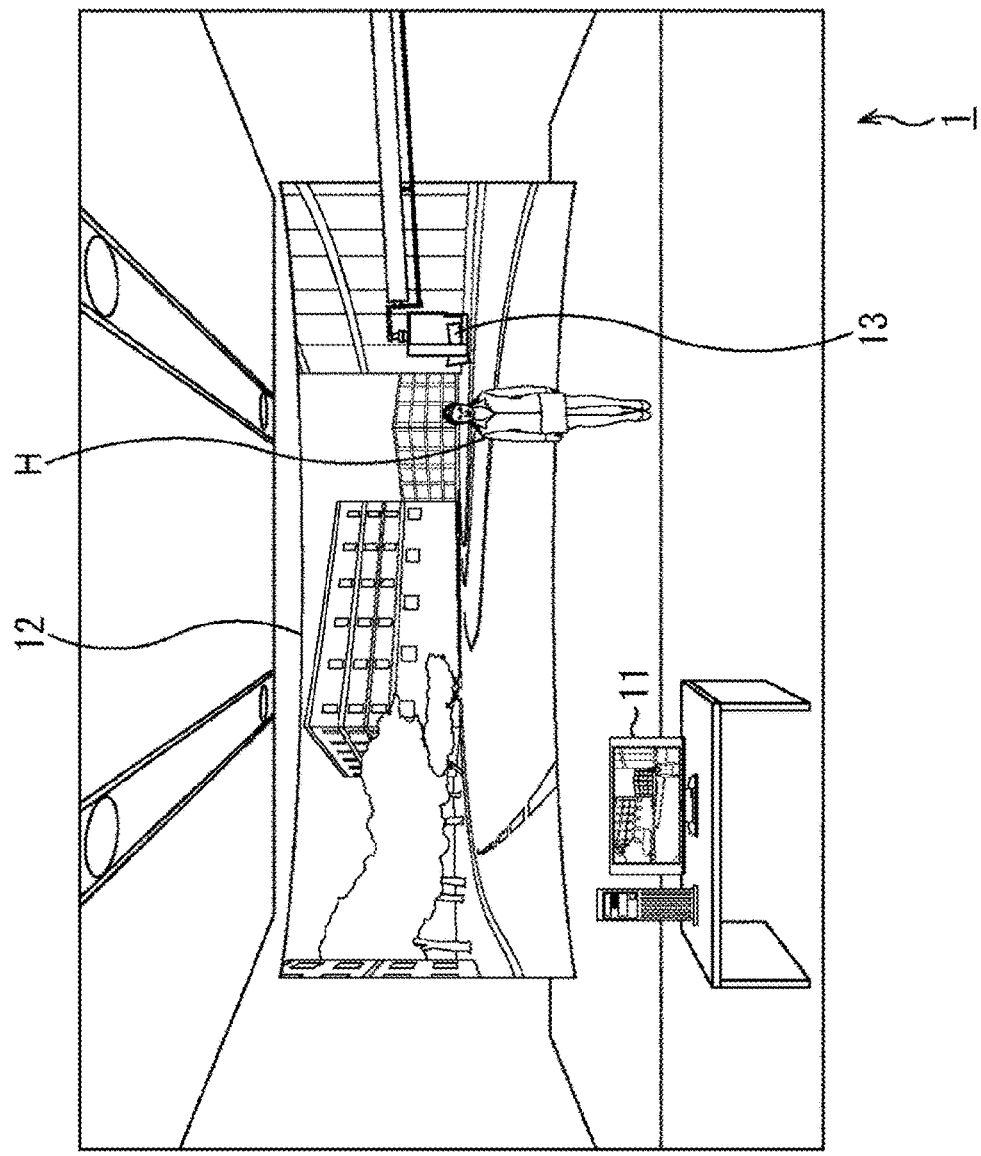
FIG. 1 is a diagram illustrating a state of an image capturing using an image-capturing system according to an embodiment of the present technology.

FIG. 1 is a diagram illustrating a state of an image capturing using an image-capturing system 1 according to an embodiment of the present technology.

The image-capturing system 1 in FIG. 1 mainly includes a PC 11, an LED display 12, and an image-capturing camera 13. The image-capturing system 1 is also provided with other devices such as a monitor for image checking and a camera other than the image-capturing camera 13.

The image-capturing system 1 is prepared in a wide space such as a shooting studio. The image-capturing system 1 shoots a movie, a drama, or the like by so-called virtual production shooting.

The large wall-like LED display 12 is installed in the shooting studio. As described later, the LED display 12 is configured by combining a plurality of display units in tiles. Respective images displayed by the plurality of display units constitute a large image of an image displayed on an entire display surface of the LED display 12. In the example in FIG. 1, an image of a scene of buildings along a road is displayed.

As illustrated in FIG. 1, a performer H stands in front of the LED display 12 and gives a performance with an image displayed on the LED display 12 as a background. The image displayed on the LED display 12 is an image on the background (background image) of the performer H.

The virtual production shooting is performed such that the performer H and the background image are shot by the image-capturing camera 13. In the example in FIG. 1, the image-capturing camera 13 of which imaging area facing a direction of the performer H is attached to a tip of a crane.

An image captured by the image-capturing camera 13 includes at least a part of an area of each of the performer H and the background image according to the imaging area (angle of view) of the image-capturing camera 13. The background image changes according to movement of the performer H, movement of the image-capturing camera 13, or the like, by which an image that appears as if there is the performer H in a space displayed by the LED display 12 is captured.

The PC 11 is a computer used for display of the LED display 12 and control of image capturing by the image-capturing camera 13. The PC 11 constitutes an information processing system. A function of the PC 11 may be achieved by one computer or may be achieved by a plurality of computers. Furthermore, at least some of the functions of the PC 11 may be achieved by a server on the Internet.

Light Environment at Time of Shooting

Figure 2:
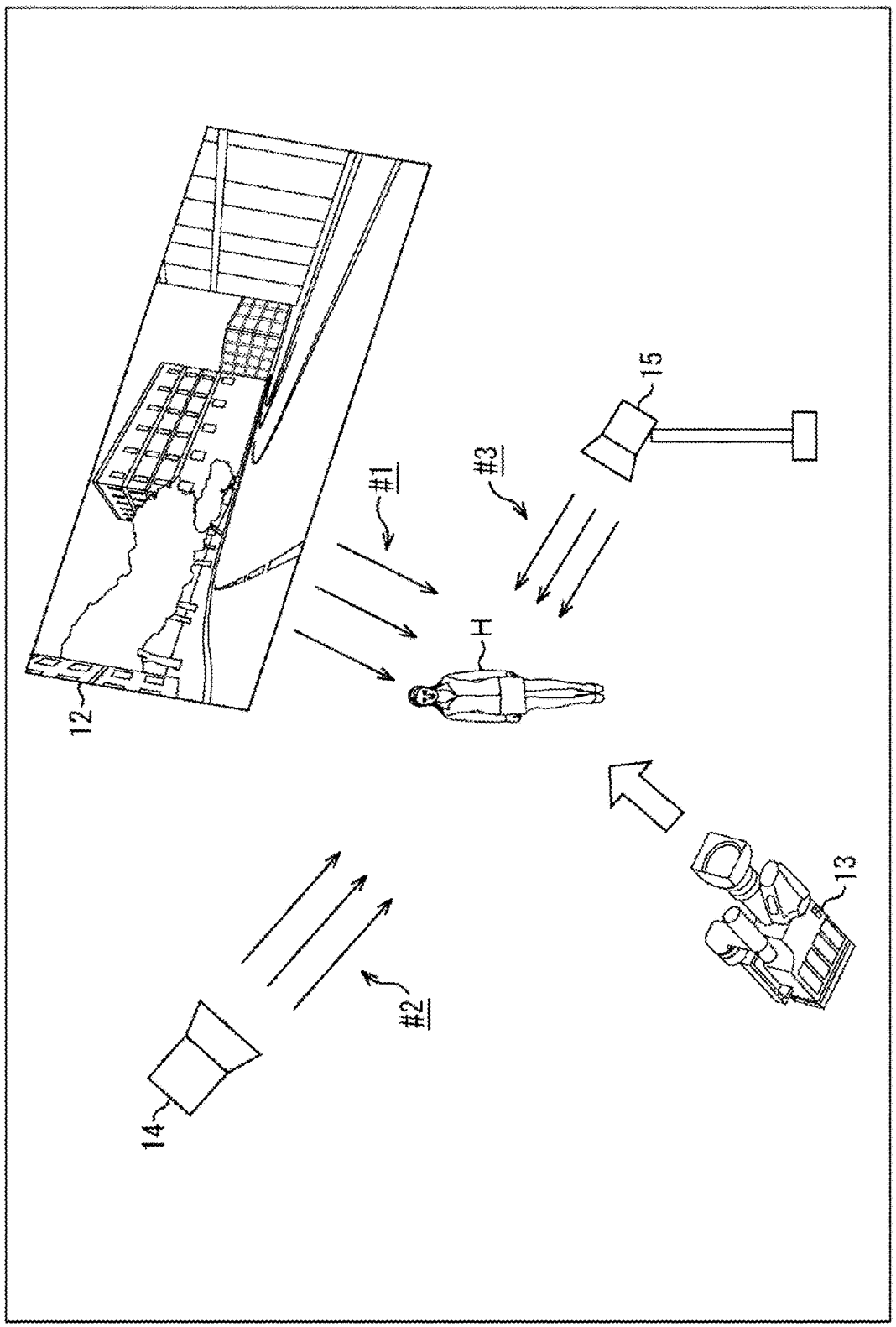
FIG. 2 is a diagram illustrating examples of light sources at a time of virtual production shooting.

FIG. 2 is a diagram illustrating examples of light sources at a time of virtual production shooting.

The image-capturing camera 13 is installed facing the performer H and the display surface of the LED display 12. The outline arrow in FIG. 2 indicates a direction of an imaging area of the image-capturing camera 13.

As indicated by arrows #1 to #3 in FIG. 2, light that irradiates the performer H at a time of virtual production shooting includes three types of light, which is light emitted from a back side by the LED display 12, light emitted from above by a lighting device 14, and light emitted from a front side by a lighting device 15. The lighting device 14 is, for example, a lighting device installed on a ceiling of the shooting studio or the like. The lighting device 15 is, for example, an upright lighting device prepared near the image-capturing camera 13. An LED display different from the LED display 12 may be installed as a device for illumination near the ceiling or the image-capturing camera 13, and the performer H may be irradiated from above or from the front side with light emitted by the LED display for illumination.

Figure 3:
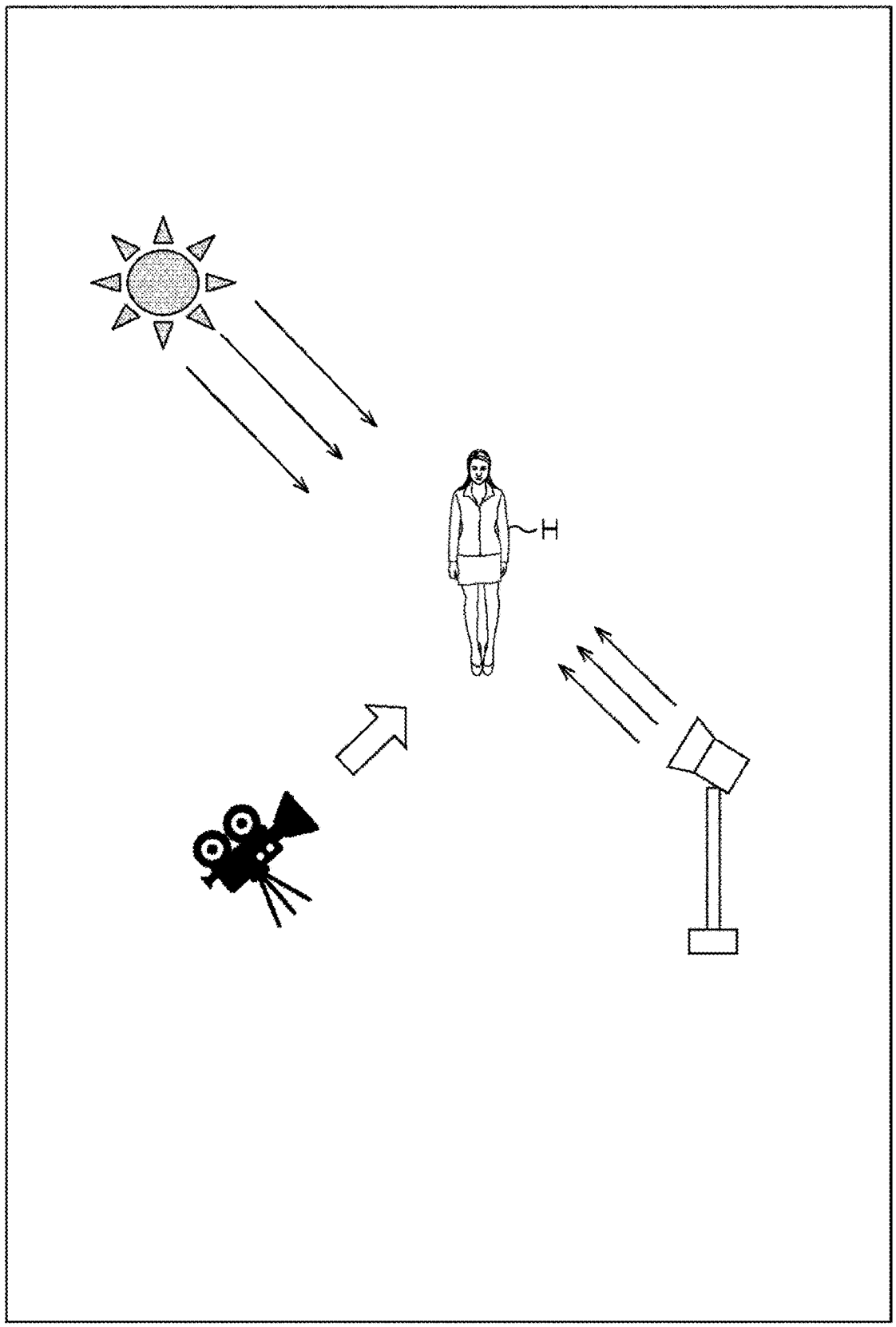
FIG. 3 is a diagram illustrating examples of light sources at a time of an ordinary shooting.

Meanwhile, in an ordinary outdoor shooting instead of the virtual production shooting, light that irradiates the performer H includes two types of light, which is natural light such as sunlight, and light emitted by a lighting device prepared near the camera, as illustrated in FIG. 3. Assuming that the light from the lighting device 14 installed on the ceiling or the like corresponds to the natural light at the time of the ordinary shooting, in the virtual production shooting, the light emitted by the LED display 12, in addition to the light at a time of the ordinary shooting, irradiates the performer H.

Figure 4:
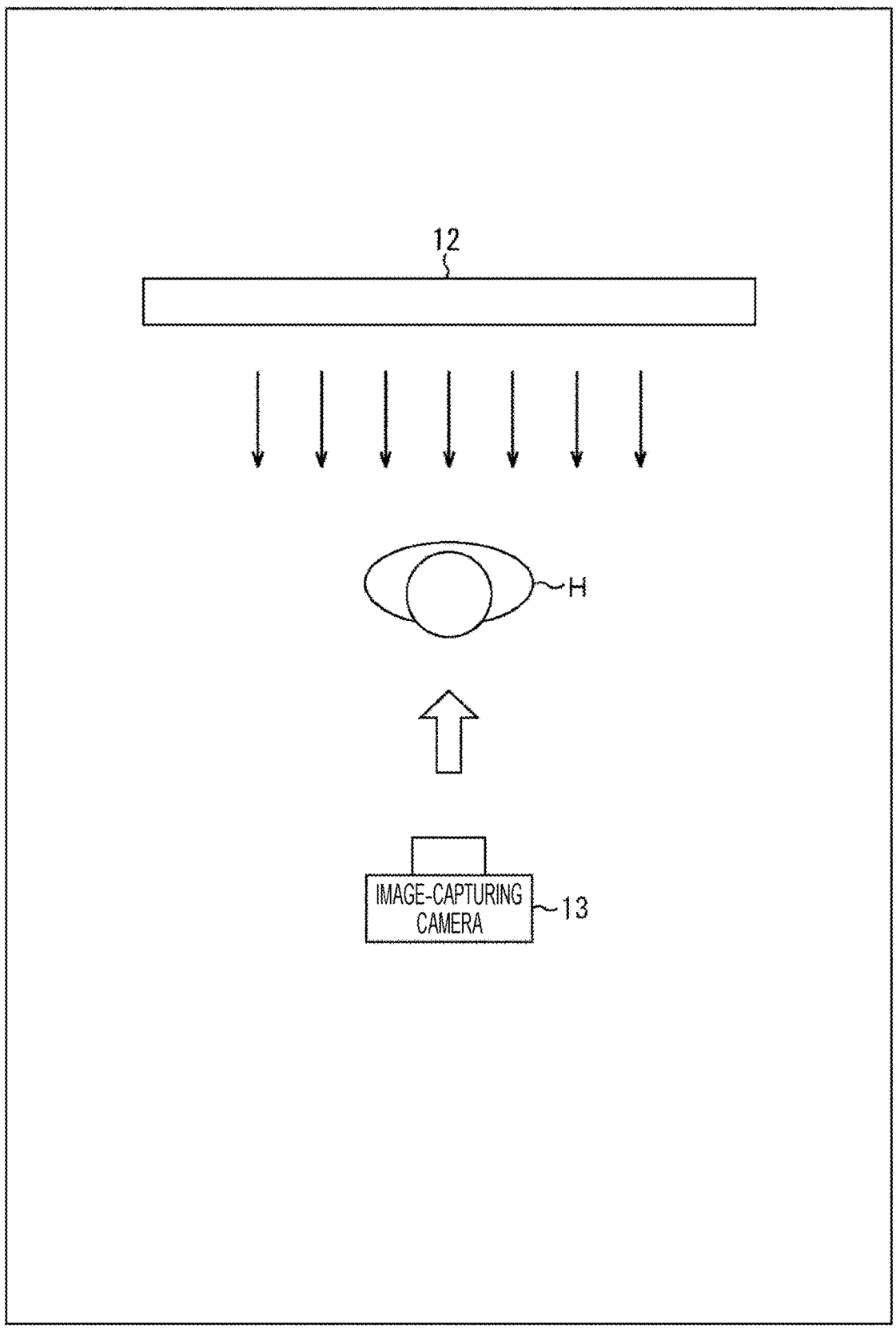
FIG. 4 is a top view of light emission by an LED display.

FIG. 4 is a top view of light emission by the LED display 12.

Figure 5A:
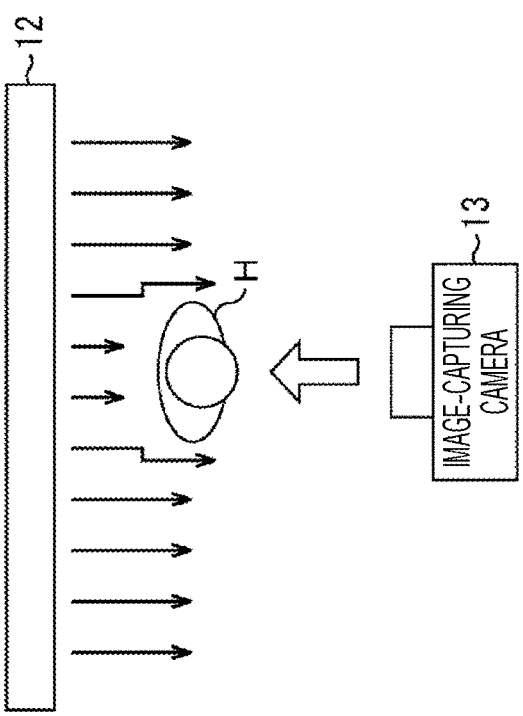
FIGS. 5A and 5B are front views of light emission by the LED display.

Because the LED display 12 is a self-luminous device, as schematically illustrated in FIG. 4, the light emitted by the LED display 12 irradiates the performer H from the back side. Some of the light from the LED display 12 that irradiates the performer H reaches the front side (a side close to the image-capturing camera 13) along a body of the performer H, as illustrated in FIG. 5A.

Figure 5B:
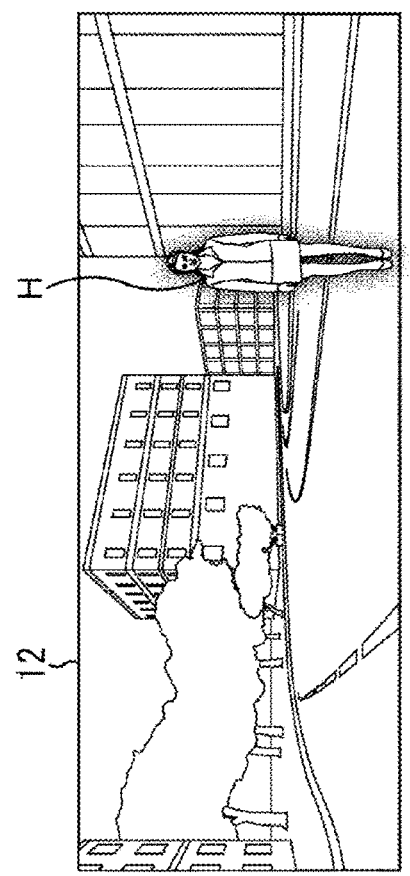

In a case where this state is viewed from the front side, as illustrated in FIG. 5B, an outline portion of the performer H appears to be shining by the light from the back side. In FIG. 5B, a light color around an outline of the performer H indicates that the outline portion is shining.

Except for a case as in a backlit scene where a light source is intentionally provided on a side close the LED display, an image captured in such a state turns out to be an image not intended by the image-capturing person, because the outline portion of the performer appears to be shining.

In the image-capturing system 1 according to an embodiment of the present technology, an image for making the outline portion of the performer H less likely to appear to be shining is generated in the PC 11 and used for display of the LED display 12.

2. Image Used for Display of LED Display

Figure 6:
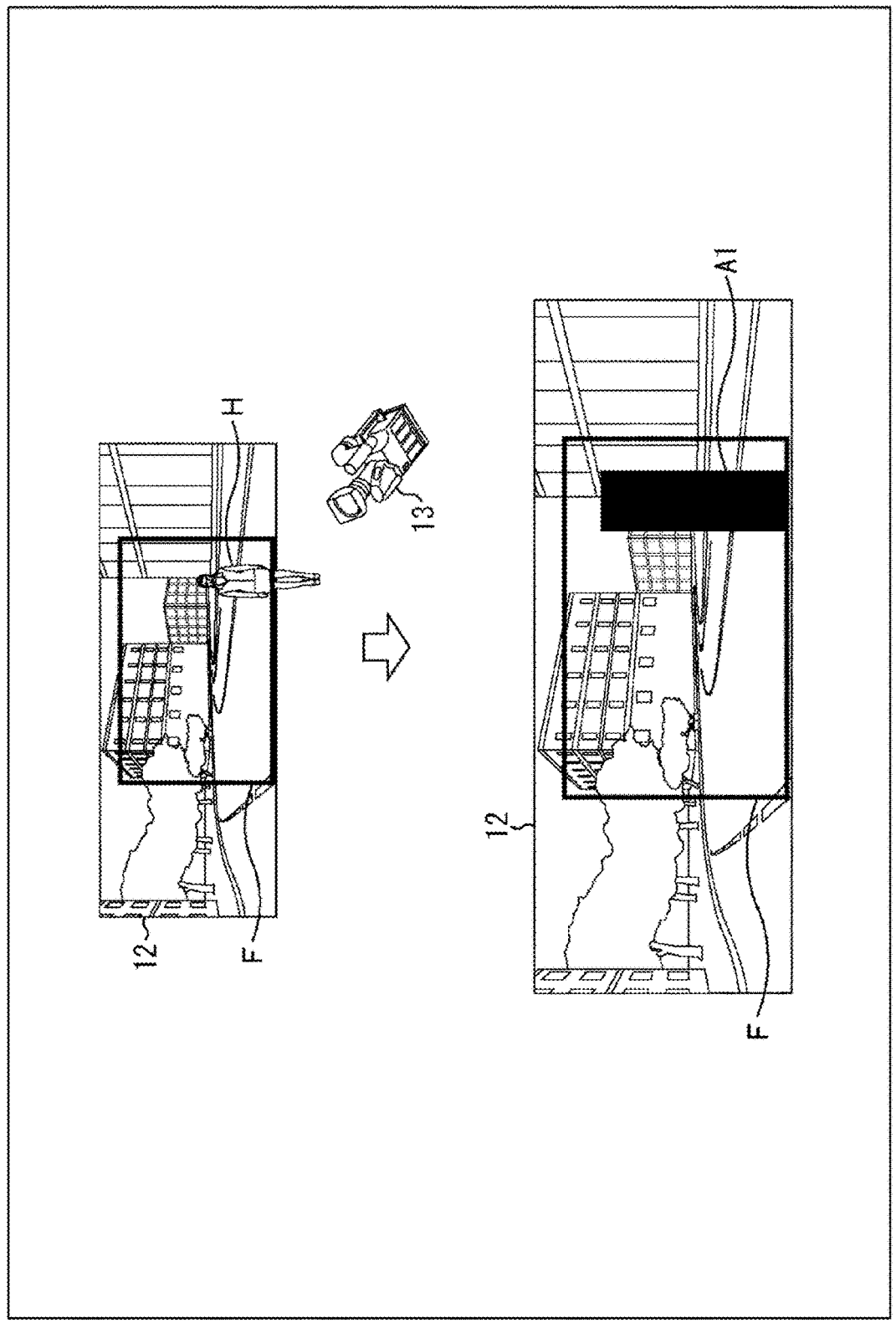
FIG. 6 is a diagram illustrating an example of a display image of the LED display.

FIG. 6 is a diagram illustrating an example of an image displayed on the LED display 12.

A frame F in the upper part of FIG. 6 illustrates an imaging area of the image-capturing camera 13. A substantially entire body of the performer H appears at a position slightly right to the center of the image captured by the image-capturing camera 13.

In this case, as illustrated in the lower part of FIG. 6, a part of an entire background image in which the performer H overlaps in the captured image is determined to be a light intensity reduction region A1, and an image in which the light intensity of the light intensity reduction region A1 is reduced is displayed on the LED display 12 as the display image. In the lower part of FIG. 6, the light intensity reduction region A1 at a position slightly right in the imaging area is denoted in black, which indicates that the light intensity at the position is lower than light intensity of a surrounding region.

As described above, the light intensity reduction region A1 is determined on the basis of a positional relationship between the image-capturing camera 13 and the performer H, and an image in which the light intensity of the light intensity reduction region A1 of the entire background image is reduced is displayed on the LED display 12 as the display image. In the example in FIG. 6, a shape of the light intensity reduction region A1 is a vertically long rectangular area, but other shapes can be used. For example, a region having a shape similar to a shape of the outline of the performer H, the shape being determined along the outline of the performer H, can be determined as the light intensity reduction region A1.

Figure 7:
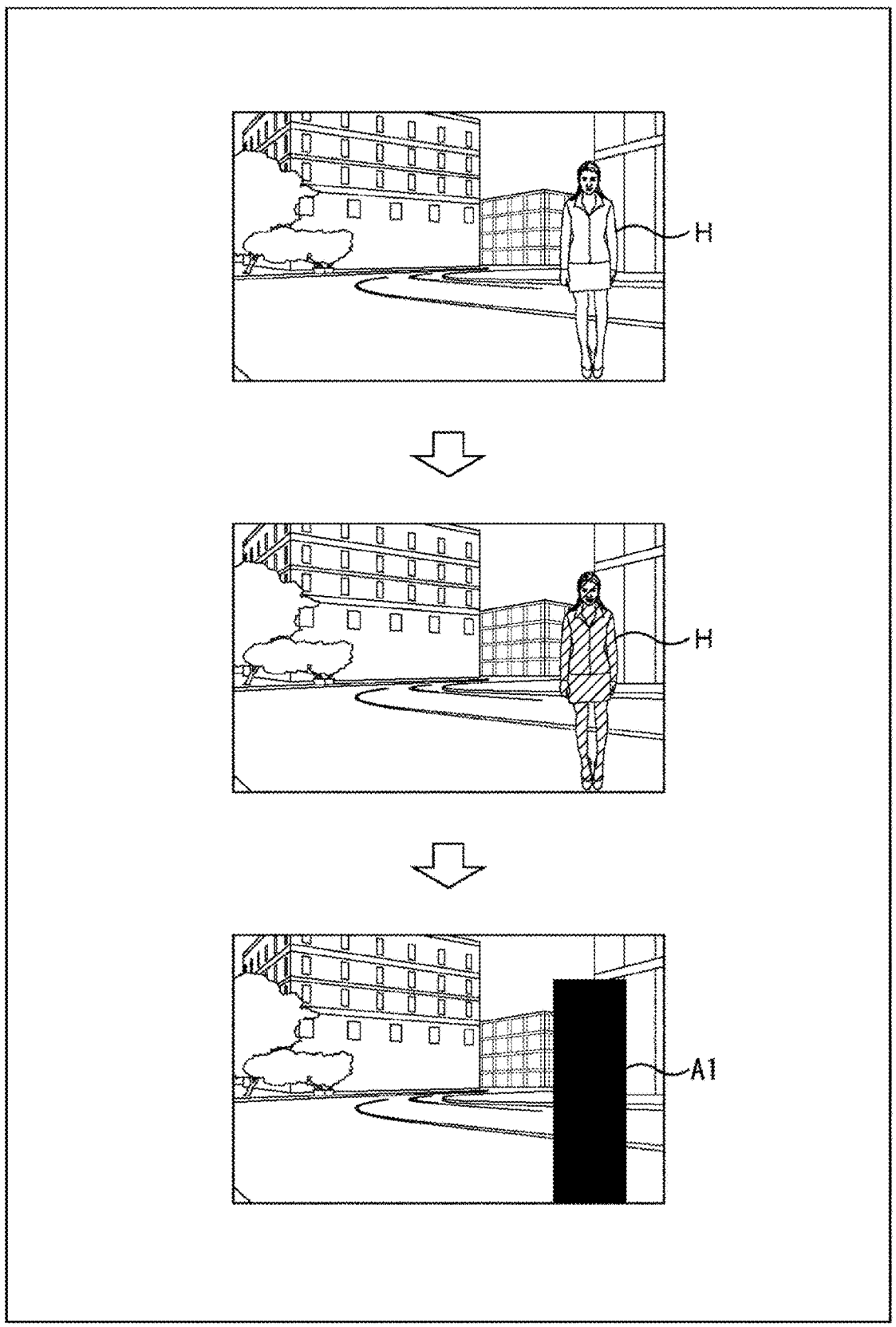
FIG. 7 is a diagram illustrating an example of generation of a display image.

FIG. 7 is a diagram illustrating an example of generation of a display image.

In a case where shooting is performed as described with reference to FIG. 6, an image illustrated in the upper part of FIG. 7 is shot. The performer H as a subject is recognized on the basis of such an image captured by the image-capturing camera 13, and a position of the performer H in the captured image is recognized as illustrated in the middle part of FIG. 7. In the middle part of FIG. 7, the hatched area denotes a region including the performer H.

In a case where the area including the performer H is recognized, a region that is in the background image and is corresponding to the region including the performer H is determined as the light intensity reduction region A1 as illustrated in the lower part of FIG. 7. In the PC 11, an image in which light intensity of the light intensity reduction region A1 of the entire background image is reduced is generated as a display image and used for display of the LED display 12. For example, by changing color of the light intensity reduction region A1 to black, the light intensity of the light intensity reduction region A1 can be reduced.

Figure 8A:
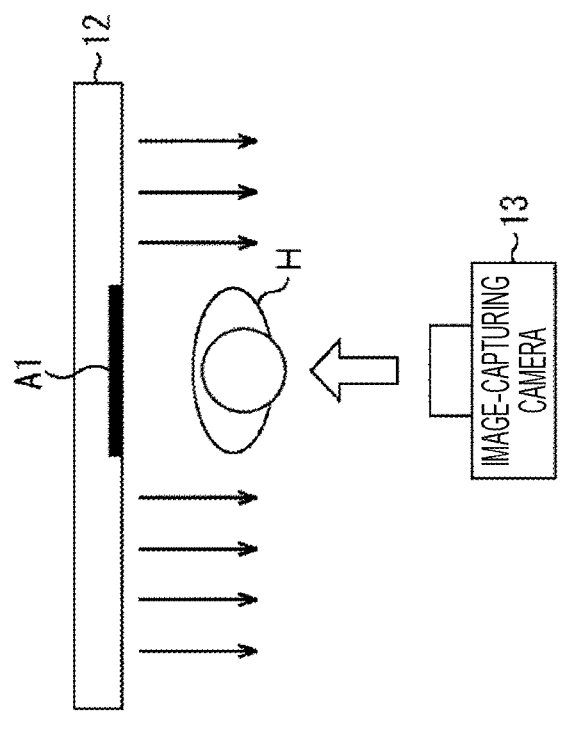
FIGS. 8A and 8B are diagrams illustrating a state of light emission in a case where an image in which light intensity of a light intensity reduction region is reduced is used as a display image.
Figure 8B:
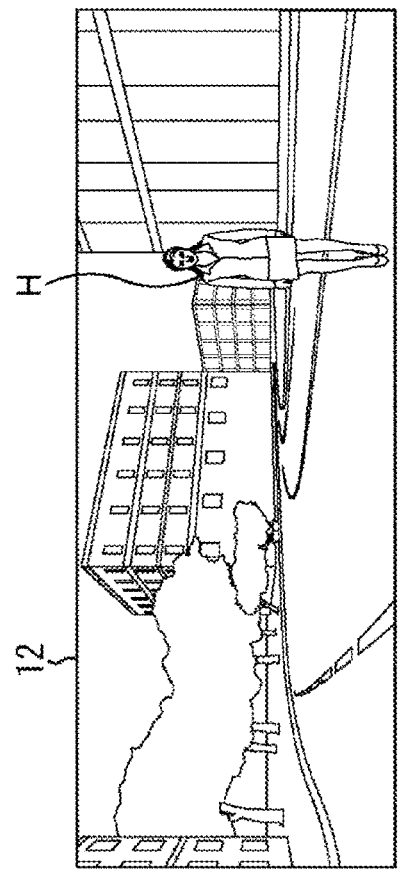

FIGS. 8A and 8B are diagrams illustrating a state of light emission in a case where an image in which light intensity of the light intensity reduction region A1 is reduced is used as a display image.

In a case where the image in which the light intensity of the light intensity reduction region A1 is reduced is displayed on the LED display 12, as illustrated in FIG. 8A, light directly irradiating the performer H from the back side is reduced. Therefore, the light emitted by the LED display 12 is less likely to reach the front side along the body of the performer H.

In a case where this state is viewed from the front side, as illustrated in FIG. 8B, the outline portion of the performer H is made less likely to appear to be shining, because the light from the back side is reduced. In FIG. 8B, no color around the outline of the performer H indicates that the outline portion is not shining. An image captured in such a state is an image including the performer H of which outline portion is not shining.

As described above, the outline portion of the performer H can be made less likely to appear to be shining by using, for display of the LED display 12, an image in which the light intensity of a region corresponding to the area including the performer H is reduced. The image-capturing person can shoot an intended image in which the outline portion of the performer H is not shining.

Operation of the PC 11 that controls display of the LED display 12 as described above will be described later with reference to a flowchart.

3. Configuration of PC

Figure 9:
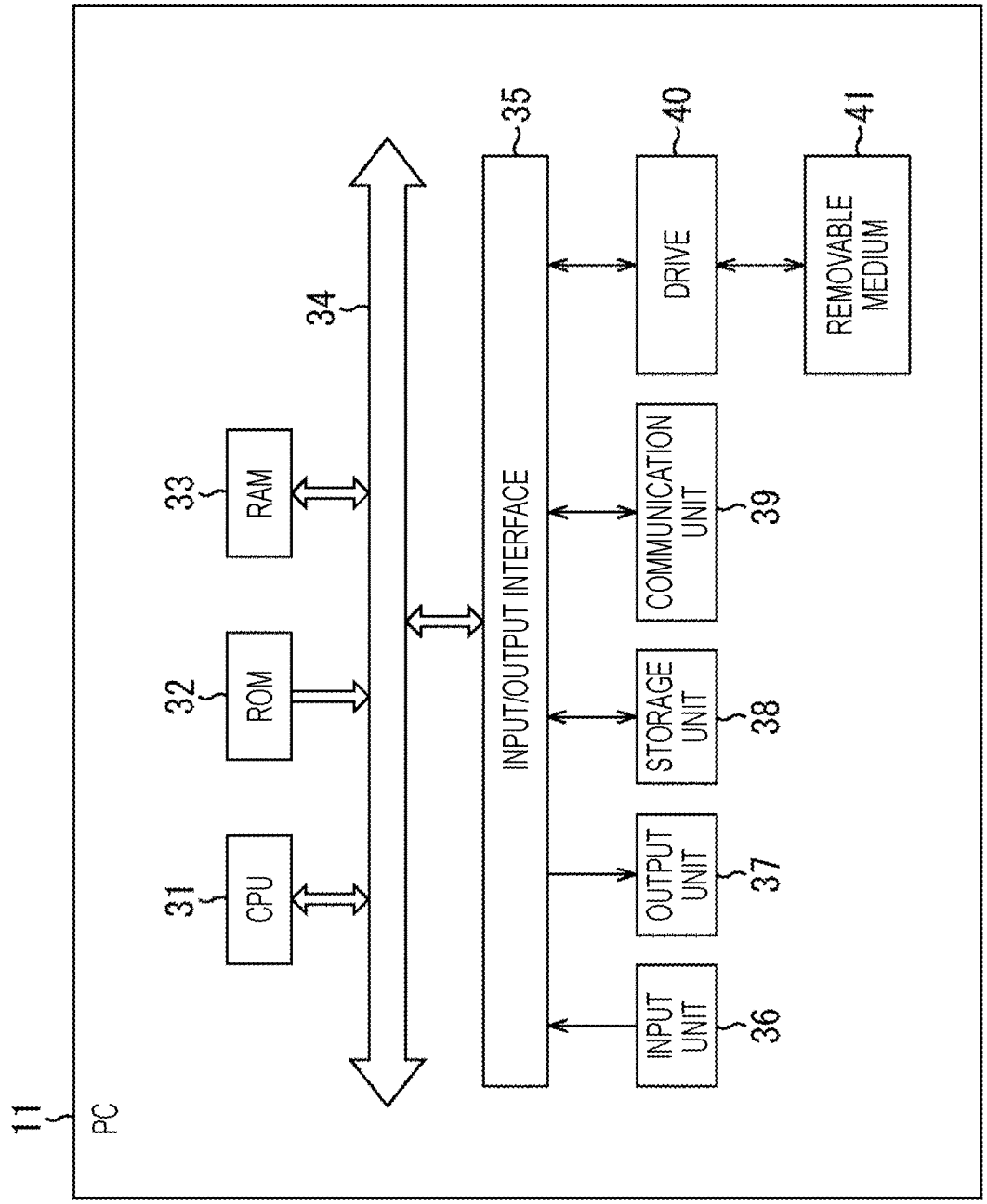
FIG. 9 is a block diagram illustrating a configuration example of hardware of a PC in FIG. 1.

FIG. 9 is a block diagram illustrating a configuration example of hardware of the PC 11 in FIG. 1.

In the PC 11 in FIG. 9, a central processing unit (CPU) 31, a read only memory (ROM) 32, and a random access memory (RAM) 33 are mutually connected by a bus 34.

An input/output interface 35 is connected to the bus 34. An input unit 36 including a keyboard, a mouse, and the like, and an output unit 37 including a display, a speaker, and the like are connected to the input/output interface 35.

Furthermore, the input/output interface 35 is connected with a storage unit 38 including a hard disk, a nonvolatile memory, and the like, a communication unit 39 including a network interface and the like, and a drive 40 that drives a removable medium 41.

The communication unit 39 communicates with a controller that controls display of the LED display 12 and with the image-capturing camera 13. For example, the communication unit 39 receives a captured image captured by the image-capturing camera 13 and camera information including parameters for image-capturing such as a position and imaging area of the image-capturing camera 13. These pieces of information are transmitted from, for example, the image-capturing camera 13 or an apparatus that controls operation of the image-capturing camera 13.

Figure 10:
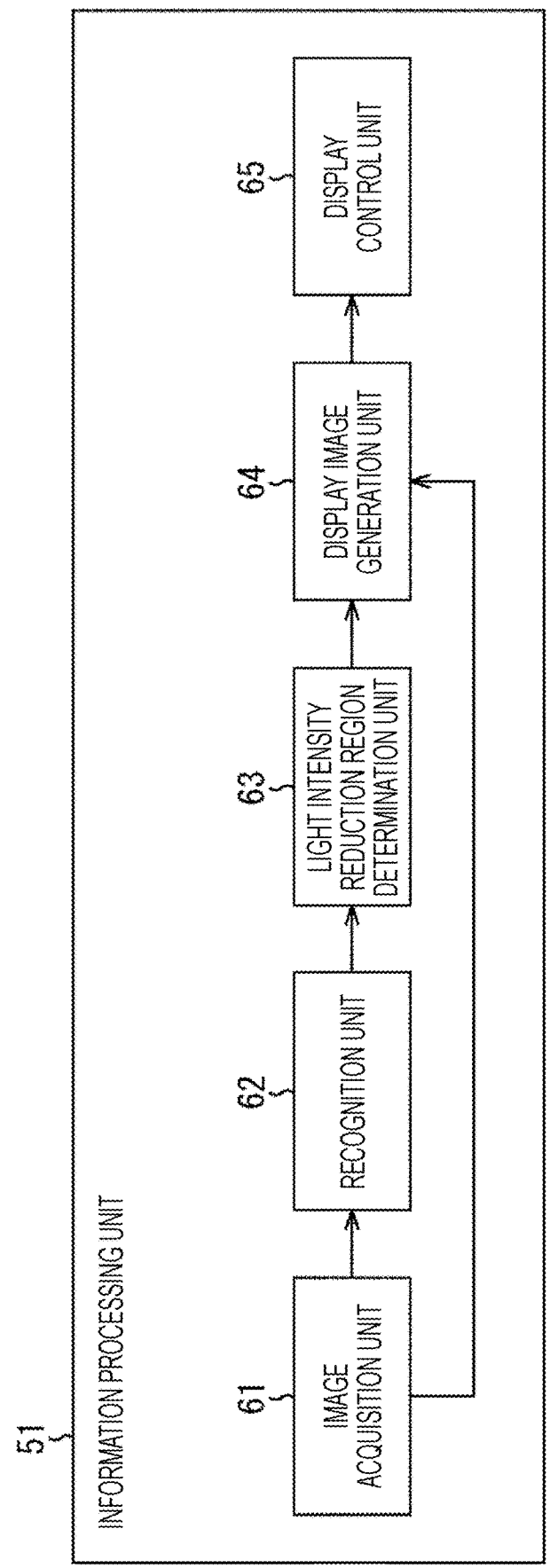
FIG. 10 is a block diagram illustrating a functional configuration example of the PC.

FIG. 10 is a block diagram illustrating a functional configuration example of the PC 11.

As illustrated in FIG. 10, an information processing unit 51 is implemented in the PC 11. The information processing unit 51 includes an image acquisition unit 61, a recognition unit 62, a light intensity reduction region determination unit 63, a display image generation unit 64, and a display control unit 65. At least a part of functional units illustrated in FIG. 10 is implemented by the CPU 31 included in the PC 11 in FIG. 9 executing a predetermined program.

The image acquisition unit 61 acquires a background image to be displayed on the LED display 12. For example, the background image is acquired by reading image data from the storage unit 38 of the PC 11. Furthermore, the image acquisition unit 61 controls the communication unit 39 to acquire the captured image transmitted from the image-capturing camera 13 or the like. The background image and captured image acquired by the image acquisition unit 61 are output to the recognition unit 62. Furthermore, the background image is output to the display image generation unit 64.

On the basis of the image or the like supplied from the image acquisition unit 61, the recognition unit 62 recognizes an object such as the performer H in front of the LED display 12 or an object installed in front of the LED display 12. At a time of shooting, an object such as a shooting set may be placed near the performer H.

Object Recognition Method 1

The recognition unit 62 recognizes an object by analyzing the captured image and performing person recognition or object recognition. The object may be recognized by deriving a difference between the captured image and a portion of the background image, the portion being corresponding to the imaging area.

Object Recognition Method 2

Figure 11:
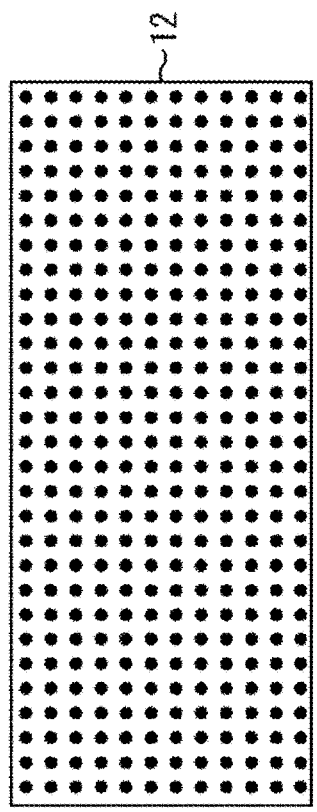
FIG. 11 is a diagram illustrating a configuration of a display surface of the LED display.

FIG. 11 is a diagram illustrating a configuration of a display surface of the LED display 12.

As illustrated in FIG. 11, a plurality of sensors such as infrared sensors may be arranged and provided on substantially the entire display surface of the LED display 12. Each of the black small circles illustrated in FIG. 11 denotes a sensor.

Figure 12A:
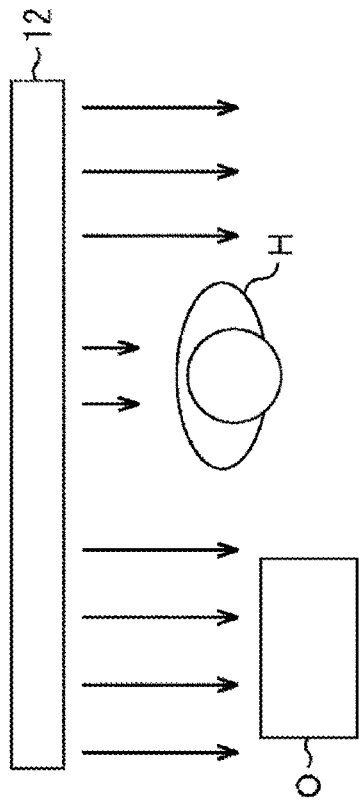
FIGS. 12A and 12B are diagrams illustrating an example of object recognition.
Figure 12B:
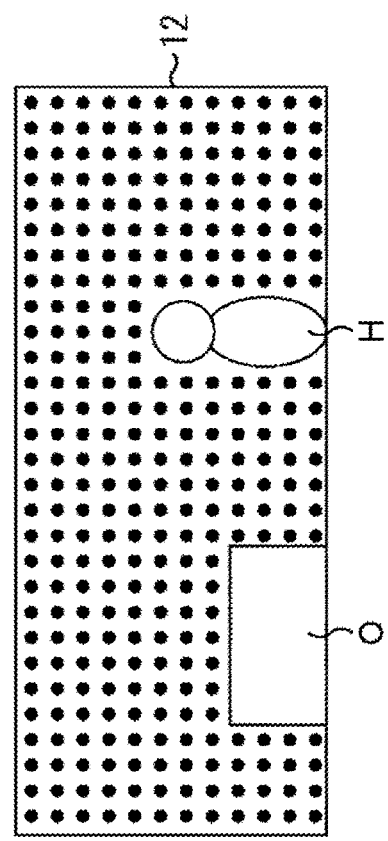

The recognition unit 62 acquires a result of measurement by each of the sensors, and recognizes an object in front of the LED display 12. For example, as illustrated in FIG. 12A and 12B, in a case where the performer H and an object O are in front of the LED display 12 as objects, each object is recognized on the basis of the result of the measurement by the sensors.

Object Recognition Method 3

Figure 13A:
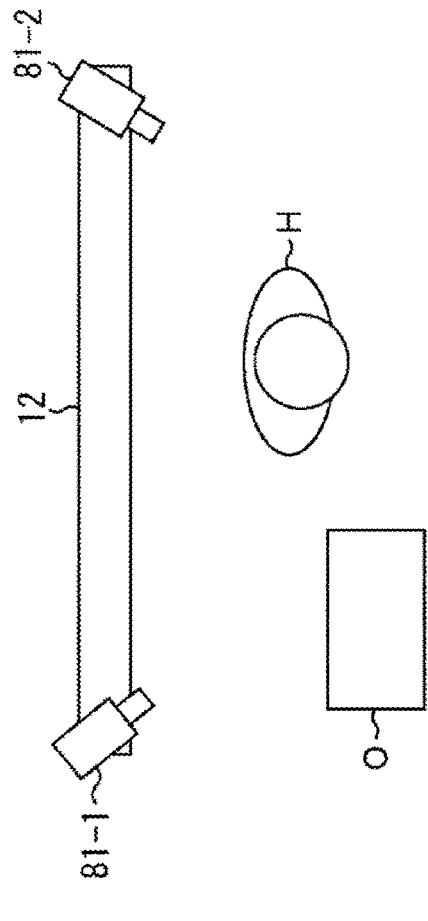
FIGS. 13A and 13B are diagrams illustrating another example of the object recognition.
Figure 13B:
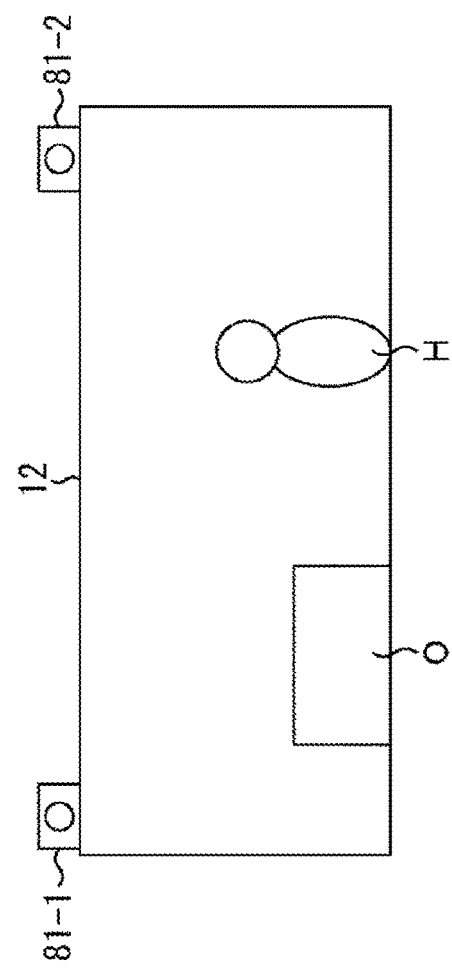

FIGS. 13A and 13B are diagrams illustrating another example of the object recognition.

As illustrated in FIG. 13A, recognition cameras 81-1, 81-2, which are cameras different from the image-capturing camera 13, may be installed with imaging areas thereof facing the front as viewed from the LED display 12. In the example in FIG. 13A, the recognition cameras 81-1, 81-2 are installed on the LED display 12.

By analyzing images captured by the recognition cameras 81-1, 81-2, the recognition unit 62 recognizes objects such as the performer H and the object O in front of the LED display 12 as illustrated in FIG. 13B.

Information of the objects recognized in this manner is output to the light intensity reduction region determination unit 63 in FIG. 10. For example, information of, for example, a position, size, or the like of the objects is supplied to the light intensity reduction region determination unit 63.

The light intensity reduction region determination unit 63 determines a light intensity reduction region on the basis of the information of the object supplied from the recognition unit 62. For the determination of the light intensity reduction region, the position and imaging area of the image-capturing camera 13 identified on the basis of the camera information are appropriately used. The camera information received by the communication unit 39 is supplied to the light intensity reduction region determination unit 63.

Figure 14:
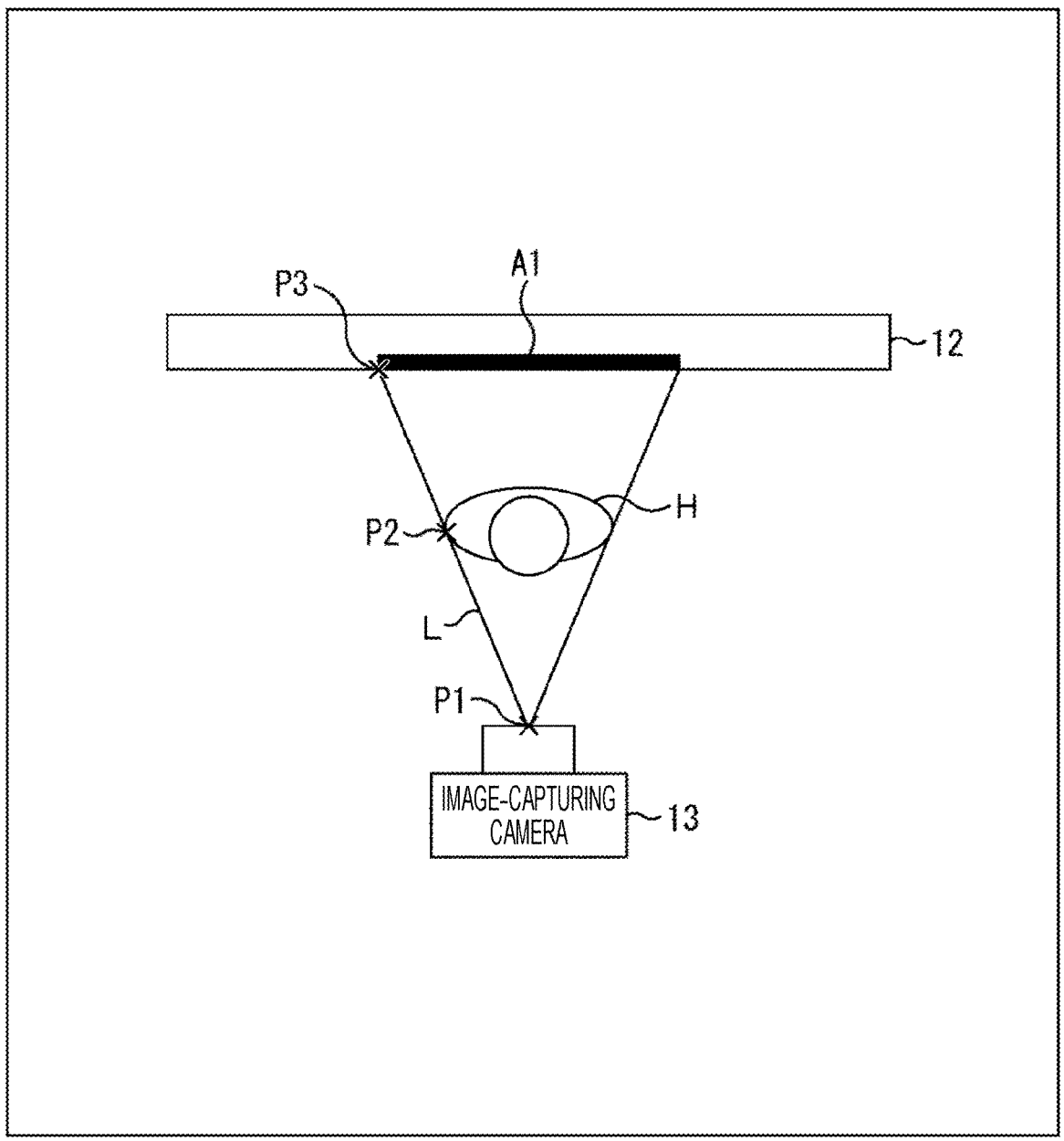
FIG. 14 is a diagram illustrating an example of determination of the light intensity reduction region.

FIG. 14 is a diagram illustrating an example of determination of the light intensity reduction region by the light intensity reduction region determination unit 63.

For example, the light intensity reduction region determination unit 63 performs ray tracing on the basis of the positional relationship between the image-capturing camera 13 and the performer H, and determines the light intensity reduction region A1.

For example, as illustrated in FIG. 14, ray tracing is performed such that a straight line L connecting a position P1 of the image-capturing camera 13 and a position P2 on the outline of the performer H is set, and a position P3 at which the display surface of the LED display 12 intersects the straight line L is detected. By performing similar processing for each position on the outline of the performer H, a region on the display surface of the LED display 12 corresponding to a region including the performer H in the captured image is identified. The light intensity reduction region A1 is determined so as to include at least a part of the area on the display surface of the LED display 12 identified in this manner.

A region having a shape similar to a shape of the region including the performer H in the captured image may be determined to be the light intensity reduction region, or a region having a predetermined shape such as a rectangle may be determined to be the light intensity reduction region.

Furthermore, the light intensity reduction region determination unit 63 may determine the light intensity reduction region on the basis of the information designated by the image-capturing person.

Figure 15:
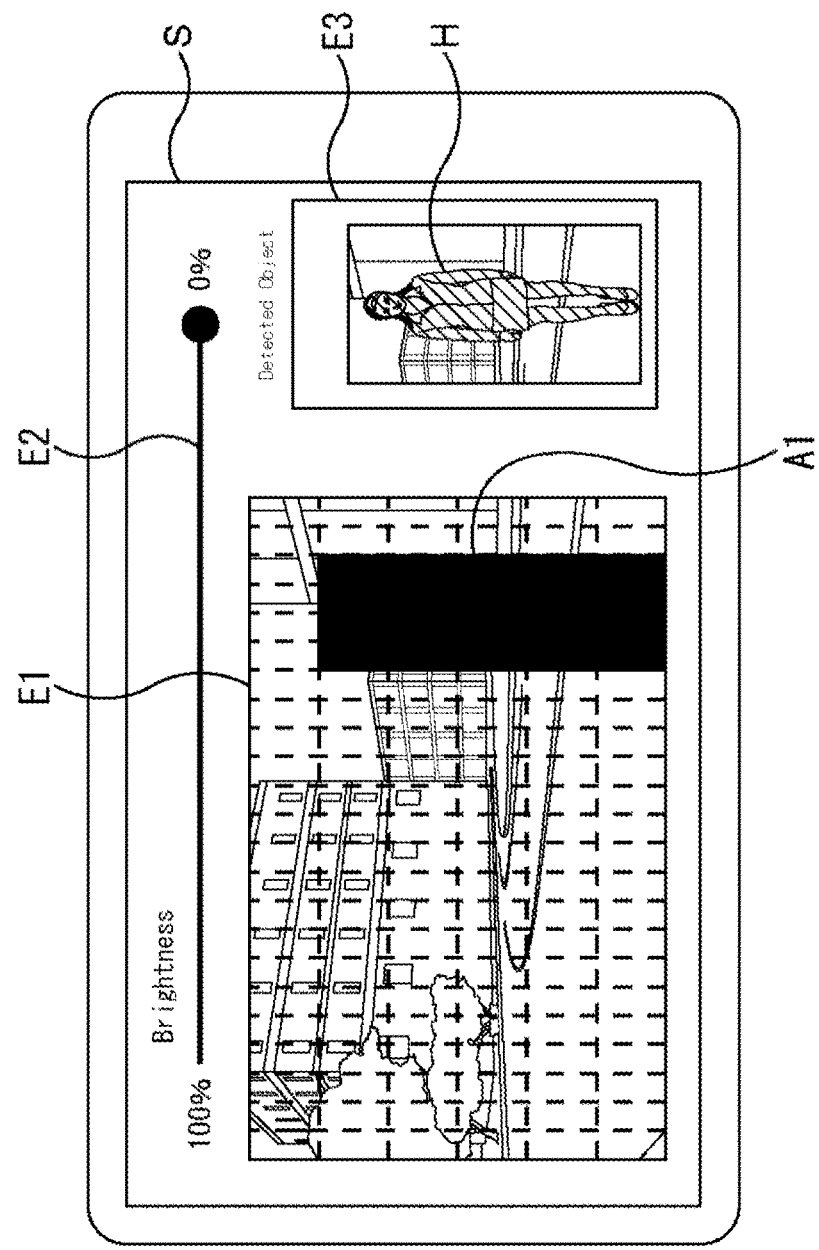
FIG. 15 is a diagram illustrating another example of determination of the light intensity reduction region.

FIG. 15 is a diagram illustrating another example of determination of the light intensity reduction region by the light intensity reduction region determination unit 63.

A display screen S illustrated in FIG. 15 is displayed on a display unit of a tablet terminal (not illustrated) or the PC 11 provided for the image-capturing system 1. The display screen S is a screen used to designate the light intensity reduction region. As illustrated in FIG. 15, the display screen S is provided with a region designation unit E1, a luminance designation unit E2, and a detected object display unit E3 as components of the screen.

The image-capturing person can issue an instruction to each element of the display screen S by operating a touch panel, a mouse, a keyboard, or the like. The tablet terminal or the PC 11 transmits to the light intensity reduction region determination unit 63, each piece of designation information generated on the basis of operation by the image-capturing person for each element of the display screen S. The designation information transmitted to the light intensity reduction region determination unit 63 is information indicating content of the operation by the image-capturing person. On the basis of each designation information transmitted from the tablet terminal or the PC 11, the light intensity reduction region determination unit 63 determines the position and area of the light intensity reduction region and luminance of the light intensity reduction region.

The region designation unit E1 in the left part of the display screen S is an element of the display screen S and is provided to designate the position and area of the light intensity reduction region A1. In response to the image-capturing person designating the position and area of the light intensity reduction region A1 with respect to the region designation unit E1, designation information for designating the position and area of the light intensity reduction region A1 is generated. The generated designation information is transmitted to the light intensity reduction region determination unit 63. Instead of both the position and area of the light intensity reduction region, either the position or the area may be designated by using display of the region designation unit E1.

As illustrated in FIG. 15, grid lines may be displayed in the region designation unit E1. The designation to the region designation unit E1 may be performed on the basis of the grid lines.

Furthermore, the position and area of the light intensity reduction region A1 determined by the light intensity reduction region determination unit 63 on the basis of a result of the recognition by the recognition unit 62 may be presented on the region designation unit E1 as an initial value. In this case, the image-capturing person performs as necessary operation of changing the position and area of the light intensity reduction region A1 determined by the light intensity reduction region determination unit 63.

The luminance designation unit E2 in the upper part of the display screen S is an element of the display screen S and is provided to designate luminance of the light intensity reduction region A1. In response to the image-capturing person designating the luminance of the light intensity reduction region A1 by using the luminance designation unit E2, designation information for designating the luminance of the light intensity reduction region A1 is generated. The generated designation information is transmitted to the light intensity reduction region determination unit 63.

As illustrated in FIG. 15, the luminance designation unit E2 may be configured by a slide bar for performing slide adjustment. The luminance of the light intensity reduction region A1 may be designated by operating the slide bar.

Furthermore, the luminance of the light intensity reduction region A1 set by the light intensity reduction region determination unit 63 on the basis of the result of the recognition by the recognition unit 62 may be presented on the luminance designation unit E2 as an initial value. In this case, the image-capturing person performs as necessary operation of changing the luminance of the light intensity reduction region A1 determined by the light intensity reduction region determination unit 63.

The detected object display unit E3 in the right part of the display screen S is an element of the display screen S and is provided to present the object included in the light intensity reduction region A1. In the example in FIG. 15, the performer H is presented as the object.

The object is presented on the detected object display unit E3 on the basis of the result of the recognition by the recognition unit 62. From among a plurality of objects recognized by the recognition unit 62, the image-capturing person can select, in response to operation with respect to the detected object display unit E3, an object to which the light intensity reduction region A1 is designated.

Furthermore, an area (outline) of the object based on the result of the recognition by the recognition unit 62 may be corrected by operating the detected object display unit E3.

The recognition of the object by the recognition unit 62 and the determination of the light intensity reduction region by the light intensity reduction region determination unit 63 are performed on, for example, each frame of the captured image and the background image. At least either the position or area of the light intensity reduction region changes following movement of the performer H or a change in the imaging area of the image-capturing camera 13. Information of the light intensity reduction region determined by the light intensity reduction region determination unit 63 is output to the display image generation unit 64.

The display image generation unit 64 generates the display image by reducing the light intensity of the light intensity reduction region of the entire background image supplied from the image acquisition unit 61, the light intensity reduction region being determined by the light intensity reduction region determination unit 63.

For example, the display image generation unit 64 generates, as the display image, a background image in which the color of the light intensity reduction region is black. A background image in which luminance of the light intensity reduction region is reduced may be generated as the display image, or luminance information may be erased from pixel information of each of pixels that constitute the light intensity reduction region, and a background image in which only color information is used may be generated as the display image. The display image generated by the display image generation unit 64 is output to the display control unit 65.

The display control unit 65 displays the display image in which the light intensity of the light intensity reduction region, which is a region where the object overlaps, is reduced. The display control unit 65 controls the communication unit 39 to transmit the display image supplied from the display image generation unit 64 to a controller (not illustrated) of the LED display 12, and causes the LED display 12 to display the display image.

4. Operation of PC

Figure 16:
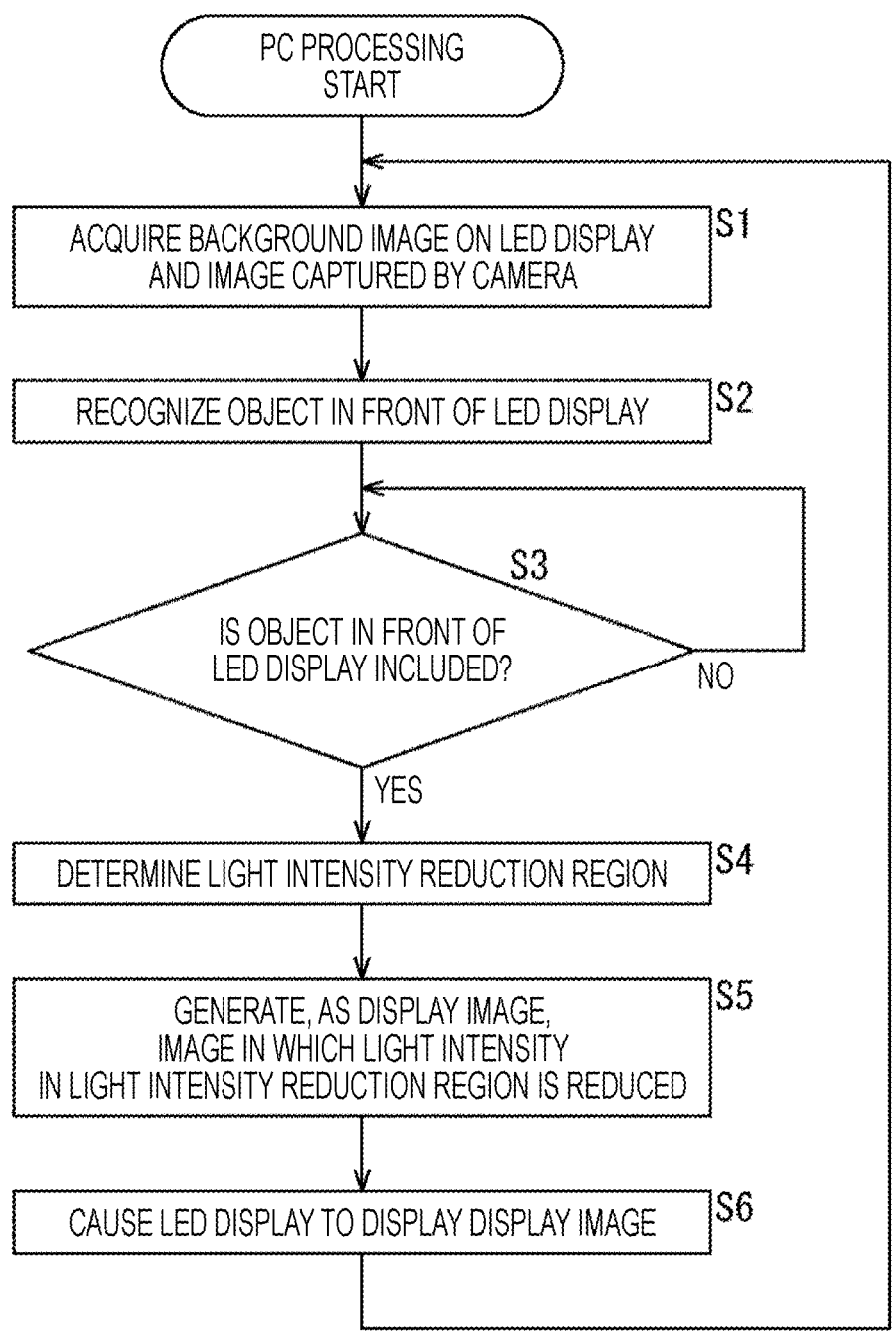
FIG. 16 is a flowchart describing processing by the PC.

Here, operation of the PC 11 will be described with reference to the flowchart in FIG. 16.

In Step S1, the image acquisition unit 61 acquires the background image displayed on the LED display 12 and the captured image captured by the image-capturing camera 13.

In Step S2, the recognition unit 62 recognizes an object in front of the LED display 12.

In Step S3, the recognition unit 62 determines whether or not the object in front of the LED display 12 is included in the image captured by the image-capturing camera 13, and waits until it is determined that the object is included in the image captured by the image-capturing camera 13. In a case where the object in front of the LED display 12 is not included in the image captured by the image-capturing camera 13, the background image for which the light intensity reduction region is not set is used as it is as the image displayed on the LED display 12.

In a case where it is determined in Step S3 that the object in front of the LED display 12 is included in the image captured by the image-capturing camera 13, the light intensity reduction region determination unit 63 determines the light intensity reduction region in Step S4 as described above.

In Step S5, the display image generation unit 64 generates, as the display image, the image in which the light intensity of the light intensity reduction region of the entire background image is reduced.

In Step S6, the display control unit 65 causes the LED display 12 to display the display image generated by the display image generation unit 64. The display of the display image in which the light intensity of the light intensity reduction region is reduced is continued during the shooting by the image-capturing camera 13, for example.

By the processing described above, the image in which the light intensity of the light intensity reduction region is reduced is used for the display of the LED display 12. The PC 11 can make an image in which the outline portion of the performer H appears to be shining less likely to be captured.

5. Light Intensity Adjustment of Light Intensity Reduction Region

Instead of setting the light intensity reduction region to a completely dark region (black region), the light intensity may be adjusted according to various conditions. The light intensity is adjusted by the display image generation unit 64 at a time of generating the display image.

Adjustment Example 1

Figure 17A:
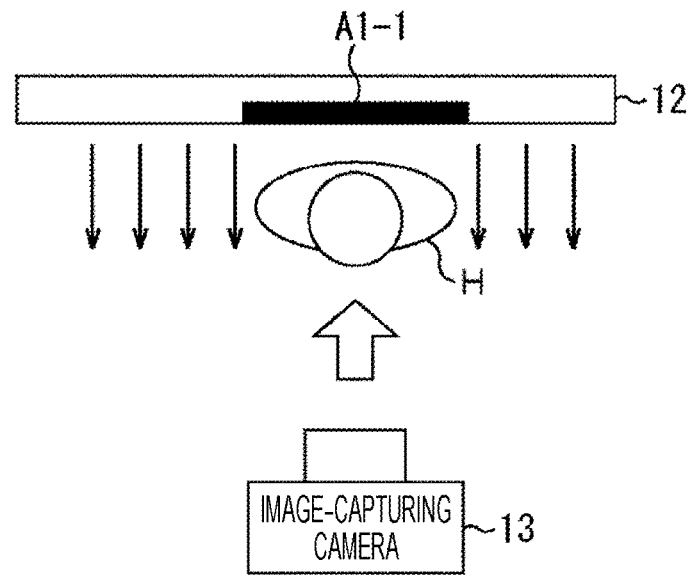
FIGS. 17A and 17B are diagrams illustrating an example of light intensity adjustment in the light intensity reduction region.
Figure 17B:
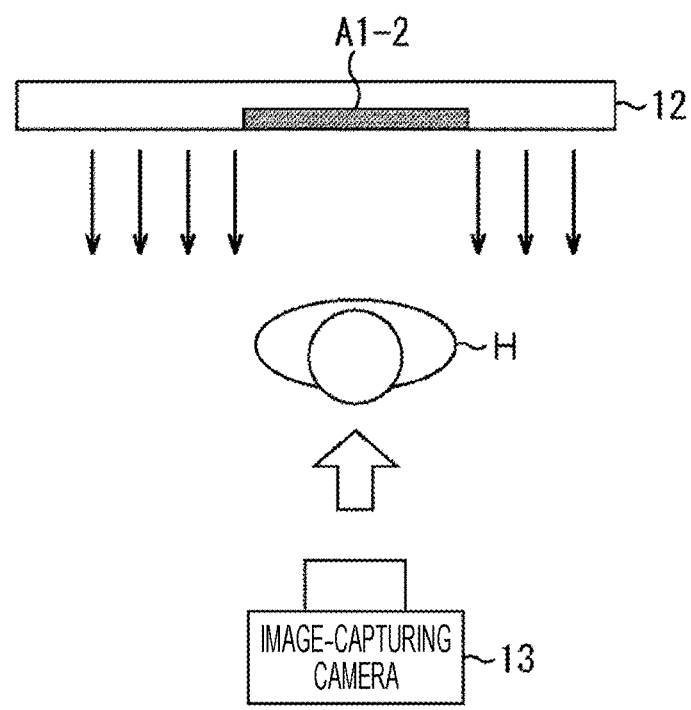

FIGS. 17A and 17B are diagram illustrating an example of light intensity adjustment in the light intensity reduction region.

The light intensity of the light intensity reduction region may be adjusted according to a positional relationship between the object and the LED display 12.

For example, in a case where a distance between the performer H and the LED display 12 is short as illustrated in FIG. 17A, the light intensity of the light intensity reduction region is adjusted so that an amount of the reduction is larger than an amount of the reduction in a case where the distance is long as illustrated in FIG. 17B. A light intensity reduction region A1-1 in FIG. 17A is illustrated in black, and a light intensity reduction region A1-2 in FIG. 17B is illustrated in a lighter color, indicating that the light intensity reduction region A1-1 is darker (an amount of reduction in light intensity is larger) than the light intensity reduction region A1-2.

In general, the closer a distance between the object and the LED display 12, the greater the intensity of light irradiating the object from the back side, and the more noticeable light emission at the outline portion of the object. By adjusting the light intensity of the light intensity reduction region so that the amount of the reduction increases as the object is closer to the LED display 12, it is possible to reduce an amount of luminescence at the outline portion while displaying a background image with less sense of incongruity.

Adjustment Example 2

The light intensity of the light intensity reduction region may be adjusted according to a shooting scene. In this case, information regarding the shooting scene is supplied to the display image generation unit 64.

For example, in a case of shooting a scene, such as a backlight scene, in which the outline portion of the performer appears to be shining naturally, a small amount is set as the amount of the reduction in the light intensity of the light intensity reduction region. This makes it possible to reproduce a state where the outline portion of the performer appears to be shining.

Adjustment Example 3

The light intensity of the light intensity reduction region may be adjusted according to intensity of lighting that irradiates the object. In this case, information regarding the intensity of the lighting is supplied to the display image generation unit 64.

For example, in a case where the lighting irradiating the performer is intense, a smaller amount is set as the amount of the reduction in the light intensity of the light intensity reduction region, than in a case where the lighting irradiating the performer is low.

Normally, in a case where the lighting irradiating the object is intense, the light emission at the outline portion is less noticeable than in a case where the lighting is low. By also adjusting the light intensity of the light intensity reduction region so that the amount of the reduction decreases as the lighting is intense, it is possible to reduce an amount of luminescence at the outline portion while displaying a background image with less sense of incongruity.

Adjustment Example 4

The light intensity of the light intensity reduction region may be adjusted according to a focus position of the image-capturing camera 13. In this case, camera information supplied to the display image generation unit 64 includes information regarding the focus position.

For example, the light intensity of the light intensity reduction region is adjusted so that the amount of reduction increases as the performer is in focus of the image-capturing camera 13.

Normally, the more the performer is in focus, the more noticeable the light emission at the outline portion. By also adjusting the light intensity of the light intensity reduction region so that the amount of the reduction increases as the performer is in focus, it is possible to reduce an amount of luminescence at the outline portion while displaying a background image with less sense of incongruity.

6. LED Display

Figure 18:
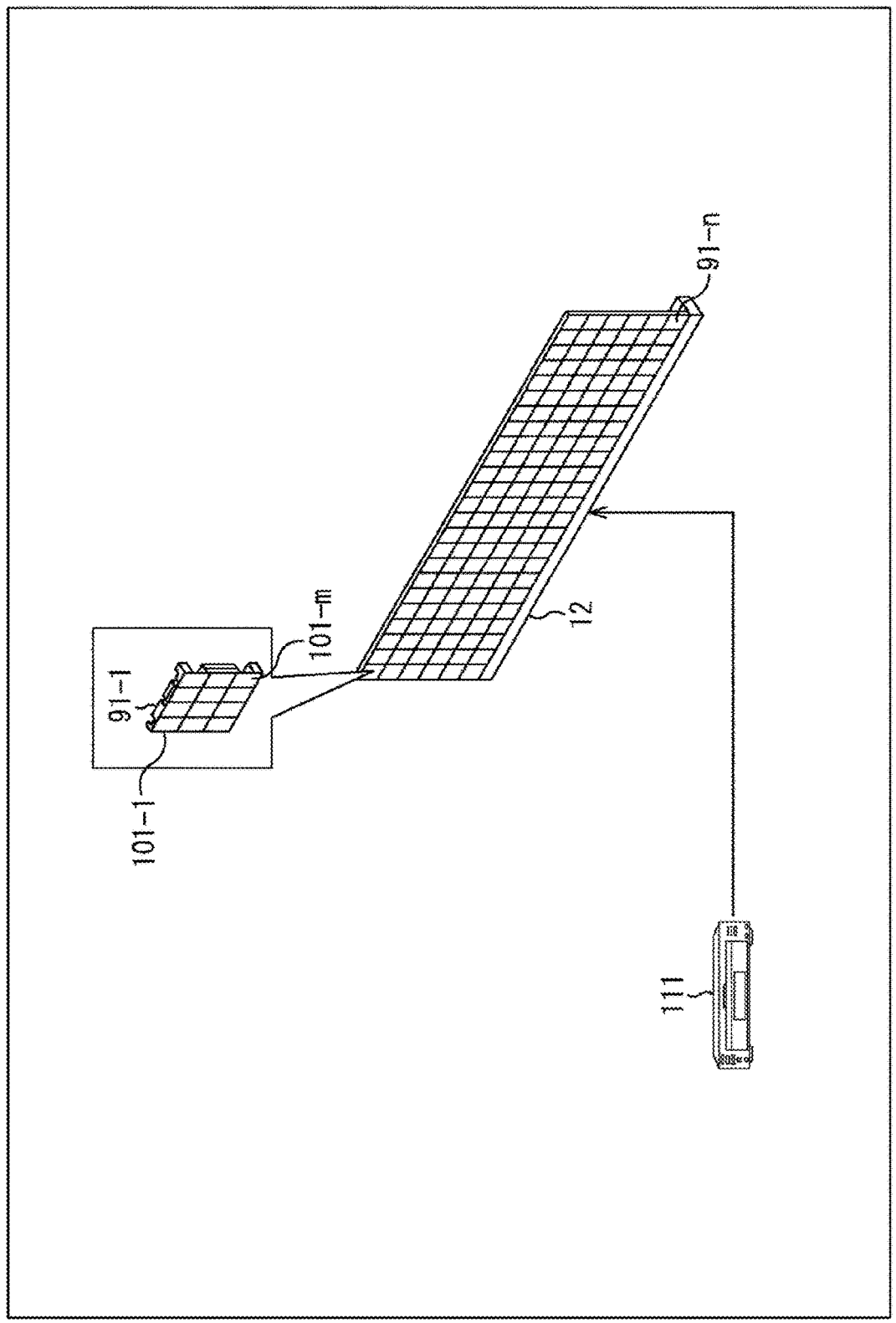
FIG. 18 is a diagram illustrating a configuration example of the LED display.

FIG. 18 is a diagram illustrating a configuration example of the LED display 12.

The LED display 12 is configured by arranging display units (cabinets) 91-1 to 91-n, which are the plurality of display units, in tiles. Hereinafter, the display units 91-1 to 91-n will be all together referred to as a display unit 91 as appropriate in a case where they are not required to be individually distinguished from each other.

As illustrated in the balloon, each display unit 91 is configured by arranging LED arrays 101 in tiles, the LED arrays 101 being modules in which LEDs corresponding to respective pixels are arranged in a matrix (two-dimensional array). In the example in FIG. 18, one display unit 91 is configured by 4× 3 LED arrays 101. Hereinafter, the LED arrays 101-1 to 101-m will be all together referred to as an LED array 101 as appropriate in a case where they are not required to be individually distinguished from each other.

For example, the sensors for object detection described with reference to FIG. 11 are provided for the respective LED arrays 101.

As illustrated in FIG. 18, each of the display units 91 of the LED display 12 is connected to an LED display controller 111 that is an external apparatus. A function of the LED display controller 111 may be mounted on the above-described PC 11, or the LED display controller 111 may be configured as an apparatus outside the PC 11 as described above. The display image described above may be generated in the LED display controller 111 that is an apparatus different from the PC 11.

On the basis of frame-based image signals supplied from the LED display controller 111, the LED display 12 displays images corresponding to the image signals in frame units. Specifically, the image signals supplied to the respective display units 91 are image signals corresponding to positions of the display units 91 on the LED display 12. Each of the display units 91 displays an image based on the image signal therefor, by which an image of one frame is displayed as the LED display 12 as a whole.

The LED display controller 111 performs predetermined signal processing on the frame-based image signals supplied from an external device. The LED display controller 111 divides the resultant frame-based image signals into n pieces according to positions of the respective display units 91, and transmits the divided image signals to the respective display units 91.

Figure 19:
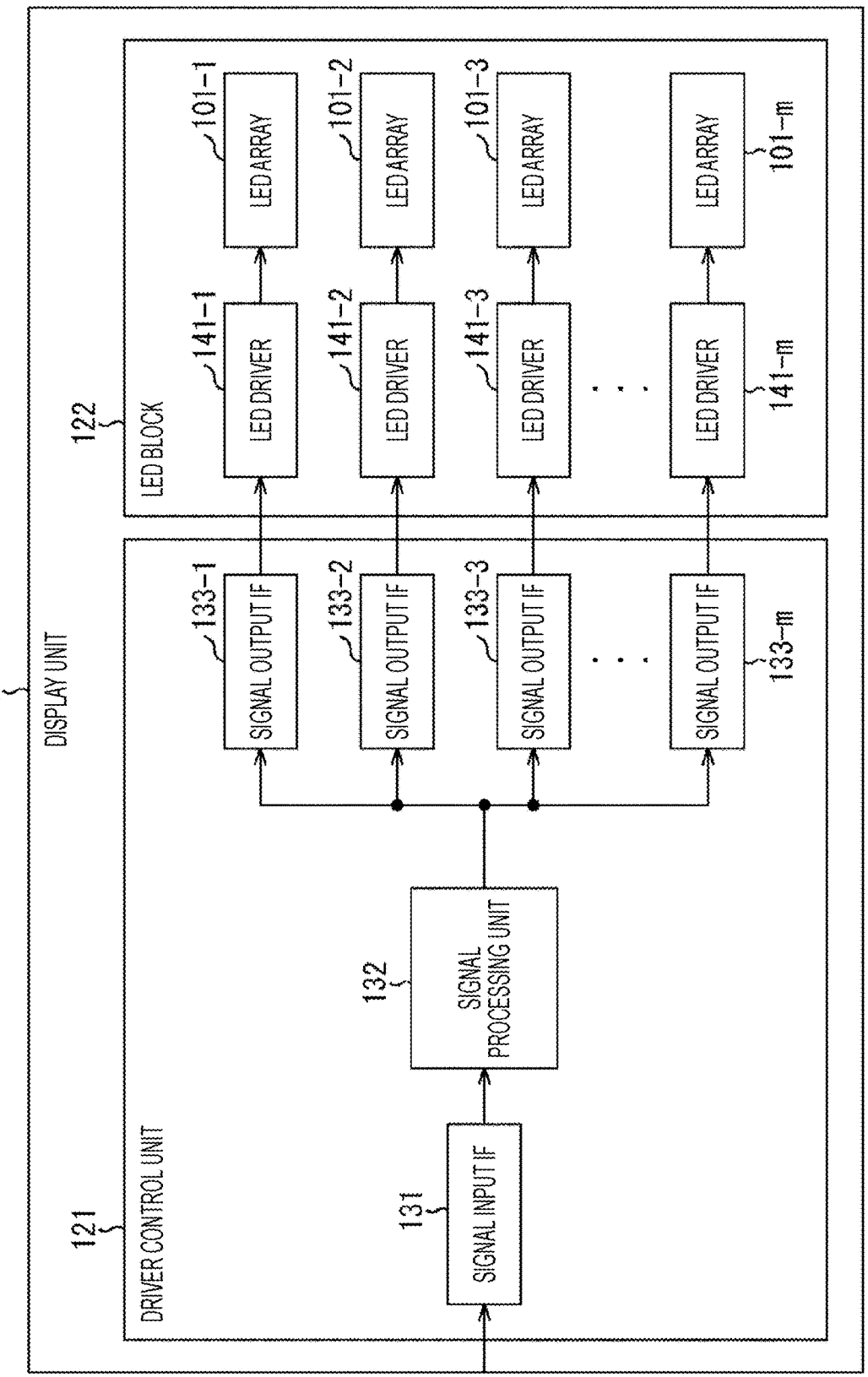
FIG. 19 is a block diagram illustrating a configuration example of a display unit.

FIG. 19 is a block diagram illustrating a configuration example of the display unit 91.

As illustrated in FIG. 19, the display unit 91 includes a driver control unit 121 and an LED block 122.

The driver control unit 121 includes a signal input IF 131, a signal processing unit 132, and signal output IFs 133-1 to 133-m.

The signal input IF 131 receives the frame-based image signals transmitted from the LED display controller 111 and supplies the image signals to the signal processing unit 132.

On the frame-based image signals supplied from the signal input IF 131, the signal processing unit 132 performs necessary signal processing such as color correction or luminance correction, which is individually necessary for the display unit 91 of own. The signal processing unit 132 divides the frame-based image signals subjected to the signal processing into m pieces according to positions of the respective LED arrays 101 on the display unit 91 of own. On the basis of the frame-based image signals subjected to the signal processing, the signal processing unit 132 generates display signals for setting light emission intensity of LEDs that constitute the respective LED arrays 101.

The signal output IFs 133-1 to 133-$m$ corresponding to the respective LED arrays 101-1 to 101-$m$ are connected the signal processing unit 132. The signal processing unit 132 supplies display signals of the LED arrays 101 to the signal output IFs 133-1 to 133-$m$ corresponding to the respective LED arrays 101.

Each of the signal output IFs 133-1 to 133-$m$ transmits the display signals supplied from the signal processing unit 132 to the LED block 122.

The LED block 122 includes LED drivers 141-1 to 141-$m$ and the LED arrays 101-1 to 101-$m$. The LED arrays 101-1 to 101-$m$ are connected to the LED drivers 141-1 to 141-$m$, respectively.

The LED drivers 141-1 to 141-$m$ drive the LEDs that constitute the LED arrays 101-1 to 101-$m$ on the basis of the display signals transmitted from the signal output IFs 133-1 to 133-$m$, respectively, to control light emission.

7. Others

Although the LED display 12 having the above-described configuration is installed upright on a floor surface (state in which the display surface is a vertical surface), the LED display 12 may be installed on the floor surface. In this case, the LED display 12 is installed with the display surface facing upward.

Similarly to the case where the LED display 12 is installed upright on the floor surface, in the case where the LED display 12 is installed on the floor surface also, display images in which light intensity of a region where the object overlaps on the captured image is appropriately reduced are generated and used for display of the LED display 12 installed on the floor surface.

The LED display 12 may be installed on a ceiling surface or may be installed on a plurality of surfaces surrounding the performer H.

About Program

The series of processing described above can be executed by hardware or can be executed by software. In a case where the series of processing is executed by software, a program that constitutes the software is installed to a computer incorporated in dedicated hardware, a general-purpose personal computer, or the like.

The program executed by the computer may be a program in which the processing is performed in time series in the order described in the present description, or may be a program in which the processing is performed in parallel or at a necessary timing such as when a call is made.

The effects described in the present specification are merely examples and are not limited, and other effects may be provided.

Embodiments of the present technology are not limited to the above-described embodiments, and various modifications may be made without departing from the gist of the present technology.

For example, the present technology may be configured as cloud computing in which one function is shared and processed in cooperation by a plurality of apparatuses via a network.

Furthermore, each step described in the flowchart described above may be executed by one apparatus or by a plurality of apparatuses in a shared manner.

Moreover, in a case where a plurality of pieces of processing is included in one step, the plurality of pieces of processing included in the one step can be executed by one apparatus or by a plurality of apparatuses in a shared manner.

In the present description, a system means a set of a plurality of components (apparatuses, modules (parts), and the like), and it does not matter whether or not all the components are in the same housing. Therefore, a plurality of apparatuses housed in different housings and connected via a network, and one apparatus in which a plurality of modules is housed in one housing are both systems.

Examples of Combinations of Configurations

The present technology can have the following configurations.

(1)
An information processing method including
displaying, on a display that displays an image serving as a background of an object, a display image in which light intensity of a region where the object overlaps is reduced on an image captured by a camera that shoots at least a part of an area of a display surface of the display.

(2)
The information processing method according to (1), further including
displaying, during a shooting by the camera, the display image in which the light intensity of the region where the object overlaps is reduced.

(3)
The information processing method according to (1) or (2), further including
determining at least a part of a region where the object overlaps as a light intensity reduction region where light intensity is reduced, and
generating the display image in which the light intensity of the light intensity reduction region is reduced.

(4)
The information processing method according to (3), further including
determining at least any one of a position, area, or luminance of the light intensity reduction region on the basis of designation information generated in response to operation with respect to an operation screen.

(5)
The information processing method according to (4),
in which the designation information is generated in response to operation designated on the operation screen, with respect to the image serving as the background of the object.

(6)
The information processing method according to any one of (3) to (5), further including
generating, as the display image, an image in which a color of the light intensity reduction region is black.

(7)
The information processing method according to any one of (3) to (5), further including
generating, as the display image, an image in which luminance of the light intensity reduction region is reduced.

(8)

The information processing method according to any one of (3) to (5), further including generating, as the display image, an image in which luminance information is erased from pixel information of each pixel that constitutes the light intensity reduction region.

(9)

The information processing method according to any one of (1) to (8), further including recognizing the object.

(10)

The information processing method according to (9), further including recognizing the object on the basis of the captured image shot by the camera.

(11)

The information processing method according to (9), further including recognizing the object on the basis of a result of measurement by a plurality of sensors arranged and provided on the display surface of the display.

(12)

The information processing method according to (9), further including recognizing the object on the basis of an image shot by a camera different from the camera that shoots the captured image.

(13)

The information processing method according to any one of (9) to (12), further including changing, on the basis of a result of recognizing the object, at least any one of a position, area, or luminance of the light intensity reduction region on the basis of designation information generated in response to operation with respect to an operation screen.

(14)

The information processing method according to any one of (3) to (8), further including adjusting the light intensity of the light intensity reduction region according to a positional relationship between the object and the display.

(15)

The information processing method according to any one of (3) to (8), further including adjusting the light intensity of the light intensity reduction region according to a shooting scene.

(16)

The information processing method according to any one of (3) to (8), further including adjusting the light intensity of the light intensity reduction region according to a focus position of the camera.

(17)

The information processing method according to any one of (3) to (8), further including adjusting the light intensity of the light intensity reduction region according to intensity of lighting that irradiates the object.

(18)

The information processing method according to any one of (3) to (8), further including changing at least either a position of or an area of the light intensity reduction region, following movement of the object.

(19)

An information processing system including a display control unit that displays, on a display that displays an image serving as a background of an object, a display image in which light intensity of a region where the object overlaps is reduced on an image captured by a camera that shoots at least a part of an area of a display surface of the display.

(20)

A program for causing a computer to execute processing of displaying, on a display that displays an image serving as a background of an object, a display image in which light intensity of a region where the object overlaps is reduced on an image captured by a camera that shoots at least a part of an area of a display surface of the display.

REFERENCE SIGNS LIST

1 Image-capturing system
11 PC
12 LED display
13 Shooting camera
61 Image acquisition unit
62 Recognition unit
63 Light intensity reduction region determination unit
64 Display image generation unit
65 Display control unit
91 Display unit
111 LED display controller

The invention claimed is:

1. An information processing method, comprising:
in an information processing system:
  displaying, on a display device, a background image as a background of an object, wherein
    the object overlaps a first region, of a plurality of regions of the displayed background image, in an image captured by a first camera, and
    the first camera shoots at least a part of an area of a display surface of the display device and the object;
  determining, as a light intensity reduction region, the first region of the displayed background image that is overlapped by the object, wherein
    a light intensity of the light intensity reduction region is less than a light intensity of a second region of the plurality of regions of the displayed background image, and
    the second region surrounds the light intensity reduction region;
  generating a display image that includes the light intensity reduction region of the background image; and
  displaying the generated display image on the display device.

2. The information processing method according to claim 1, further comprising displaying the display image at a time of shooting by the first camera.

3. The information processing method according to claim 1, further comprising determining at least one of a position of the light intensity reduction region, an area of the light intensity reduction region, or a luminance of the light intensity reduction region based on designation information, wherein the designation information indicates content of an operation with respect to an operation screen.

4. The information processing method according to claim 3, wherein the content of the operation is associated with the background image.

5. The information processing method according to claim 1, further comprising generating, as the display image, an image in which a color of the light intensity reduction region is black.

6. The information processing method according to claim 1, further comprising generating, as the display image, an image in which a luminance of the light intensity reduction region is reduced, wherein the luminance of the light intensity reduction region is less than a luminance of the second region.

7. The information processing method according to claim 1, further comprising generating, as the display image, an image in which luminance information is erased from pixel information, wherein the pixel information is associated with each pixel of a plurality of pixels that constitutes the light intensity reduction region.

8. The information processing method according to claim 1, further comprising recognizing the object.

9. The information processing method according to claim 1, further comprising recognizing the object based on the image captured by the first camera.

10. The information processing method according to claim 1, further comprising recognizing the object based on a result of measurement by a plurality of sensors, wherein the plurality of sensors is arranged on the display surface of the display device.

11. The information processing method according to claim 1, further comprising recognizing the object based on an image shot by a second camera different from the first camera that shoots the captured image.

12. The information processing method according to claim 1, further comprising:
recognizing the object; and
changing, based on a result of the recognition of the object and designation information, at least one of a position of the light intensity reduction region, an area of the light intensity reduction region, or a luminance of the light intensity reduction region, wherein the designation information indicates content of an operation with respect to an operation screen.

13. The information processing method according to claim 1, further comprising adjusting the light intensity of the light intensity reduction region based on a positional relationship between the object and the display device.

14. The information processing method according to claim 1, further comprising adjusting the light intensity of the light intensity reduction region based on a shooting scene.

15. The information processing method according to claim 1, further comprising adjusting the light intensity of the light intensity reduction region based on a focus position of the first camera.

16. The information processing method according to claim 1, further comprising adjusting the light intensity of the light intensity reduction region based on an intensity of lighting that irradiates the object.

17. The information processing method according to claim 1, further comprising changing at least one of a position of the light intensity reduction region or an area of the light intensity reduction region based on a movement of the object.

18. An information processing system, comprising:
a display control unit configured to control a display of a background image on a display device, wherein
the background image is displayed as a background of an object,
the object overlaps a first region, of a plurality of regions of the displayed background image, in an image captured by a camera, and
the camera shoots at least a part of an area of a display surface of the display device and the object;
a determination unit configured to determine, as a light intensity reduction region, the first region of the displayed background image that is overlapped by the object, wherein
a light intensity of the light intensity reduction region of the background image is less than a second region of the plurality of regions of the displayed background image, and
the second region surrounds the light intensity reduction region;
an image generation unit configured to generate a display image which includes the light intensity reduction region of the background image; and
a display unit configured to display, on the display device, the generated display image.

19. A non-transitory computer-readable medium having stored thereon, computer-executable instructions which, when executed by a processor, cause the processor to execute operations, the operations comprising:
displaying, on a display device, a background image as a background of an object, wherein
the object overlaps a first region, of a plurality of regions of the displayed background image, in an image captured by a camera, and
the camera shoots at least a part of an area of a display surface of the display device and the object;
determining, as a light intensity reduction region, the first region of the displayed background image that is overlapped by the object in the image captured by the camera, wherein
a light intensity of the light intensity reduction region of the background image is less than a second region of the plurality of regions of the displayed background image, and
the second region surrounds the light intensity reduction region;
generating a display image which includes the light intensity reduction region of the background image; and
displaying, on the display device, the generated display image.

20. An information processing method, comprising:
in an information processing system:
displaying, on a display device, a background image as a background of an object, wherein
the object overlaps a first region, of a plurality of regions of the displayed background image, in an image captured by a camera, and
the camera shoots at least a part of an area of a display surface of the display device and the object;
determining, as a light intensity reduction region, the first region of the displayed background image that is overlapped by the object;
adjusting a light intensity of the light intensity reduction region based on an intensity of lighting that irradiates the object, wherein
the light intensity of the light intensity reduction region is less than a light intensity of a second region of the plurality of regions of the displayed background image, and the second region surrounds the light intensity reduction region;
generating a display image that includes the light intensity reduction region of the background image; and
displaying the generated display image on the display device.

\* \* \* \* \*